United States Patent

[11] 3,568,867

| [72] | Inventors | Peter Sammarco<br>Bellwood;<br>Robert W. Sanderson, III, Lombard;<br>Arnold Zimmerman, Downers Grove, Ill. |
|---|---|---|
| [21] | Appl. No. | 804,578 |
| [22] | Filed | Mar. 5, 1969 |
| [45] | Patented | Mar. 9, 1971 |
| [73] | Assignee | International Harvester Company<br>Chicago, Ill. |

[54] CONVEYOR EXTENSION
6 Claims, 4 Drawing Figs.

[52] U.S. Cl. .................................................. 214/522,
214/83.26, 214/83.32, 198/87, 198/115
[51] Int. Cl. .................................................. B60p 1/40
[50] Field of Search ....................................... 214/520,
521, 522, 83.32, 83.26; 198/87, 64, 213, 113, 114, 115

[56] References Cited
UNITED STATES PATENTS

| 2,772,767 | 12/1956 | Seifert .......................... | 198/115 |
| 3,047,174 | 7/1962 | Kasten .......................... | 214/520 |
| 3,175,676 | 3/1965 | Schaaf .......................... | 198/114 |
| 3,331,519 | 7/1967 | Jennings, Jr. .................. | 214/522X |

*Primary Examiner*—Albert J. Makay
*Attorneys*—Noel G. Artman

ABSTRACT: An extension for an auger-type cross conveyor of a conventional self-unloading wagon wherein the extension includes an auger supported in a trough pivotally mounted on the wagon box for swinging movement about horizontal and vertical axes. The auger of the cross conveyor and the auger of the extension are provided with universal joint sections providing a driving connection therebetween which accommodates pivoting movement of the extension about the horizontal axis. The universal joint sections are separable upon swinging the extension about the vertical axis to a transport position.

PATENTED MAR 9 1971

3,568,867

INVENTORS
PETER SAMMARCO
ROBERT W. SANDERSON III
ARNOLD ZIMMERMAN
BY Neal C. Johnson
ATT'Y.

CONVEYOR EXTENSION

BACKGROUND OF THE INVENTION

1. Field of the Invention

The invention relates generally to self-unloading wagons and more particularly to an extension for the cross conveyor of the wagon.

2. Prior Art

It is common practice to provide self-unloading wagons with extensions for the cross conveyors thereof for the purpose of facilitating unloading the material into bunk feeders and the like. Since the typical self-unloading wagon discharges the material from the side thereof, the extension of the cross conveyor greatly increases the total width of the wagon. In many cases, the extension conveyor increases the width of the forage wagon beyond that permitted by the highway laws of most states. Accordingly, when the wagon is moved on a highway or in other areas restricted in space the conveyor extension must be physically removed from the wagon. This can be a time-consuming and troublesome task. Moreover, upon removal of the conveyor extension the problem remains of where and how to carry the extension on the wagon during transport.

SUMMARY

The invention provides an improved conveyor extension which is mounted on the side of the forage wagon for pivoting movement between operative and transport positions. When disposed in the operative position the conveyor extension is swingable about a horizontal axis so as to vary the elevation of the material being discharged. The conveyor extension is swingable about a vertical axis to a transport position in front of the wagon wherein the extension does not project beyond the side of the wagon. Thus the width of the wagon is not increased thereby permitting the wagon to be moved on highways and through restricted areas. The problems associated with removal of the conveyor extension and storage thereof are completely eliminated.

The objects of the invention may be briefly summarized as follows: To provide a conveyor extension for a self-unloading wagon wherein the extension is quickly and easily disposed between operative and transport positions and to provide a conveyor extension for a self-unloading wagon wherein the extension is disposed in a transport position which does not increase the width of the wagon.

DESCRIPTION OF THE PREFERRED EMBODIMENT

Figures 1, 2, 3, 4:
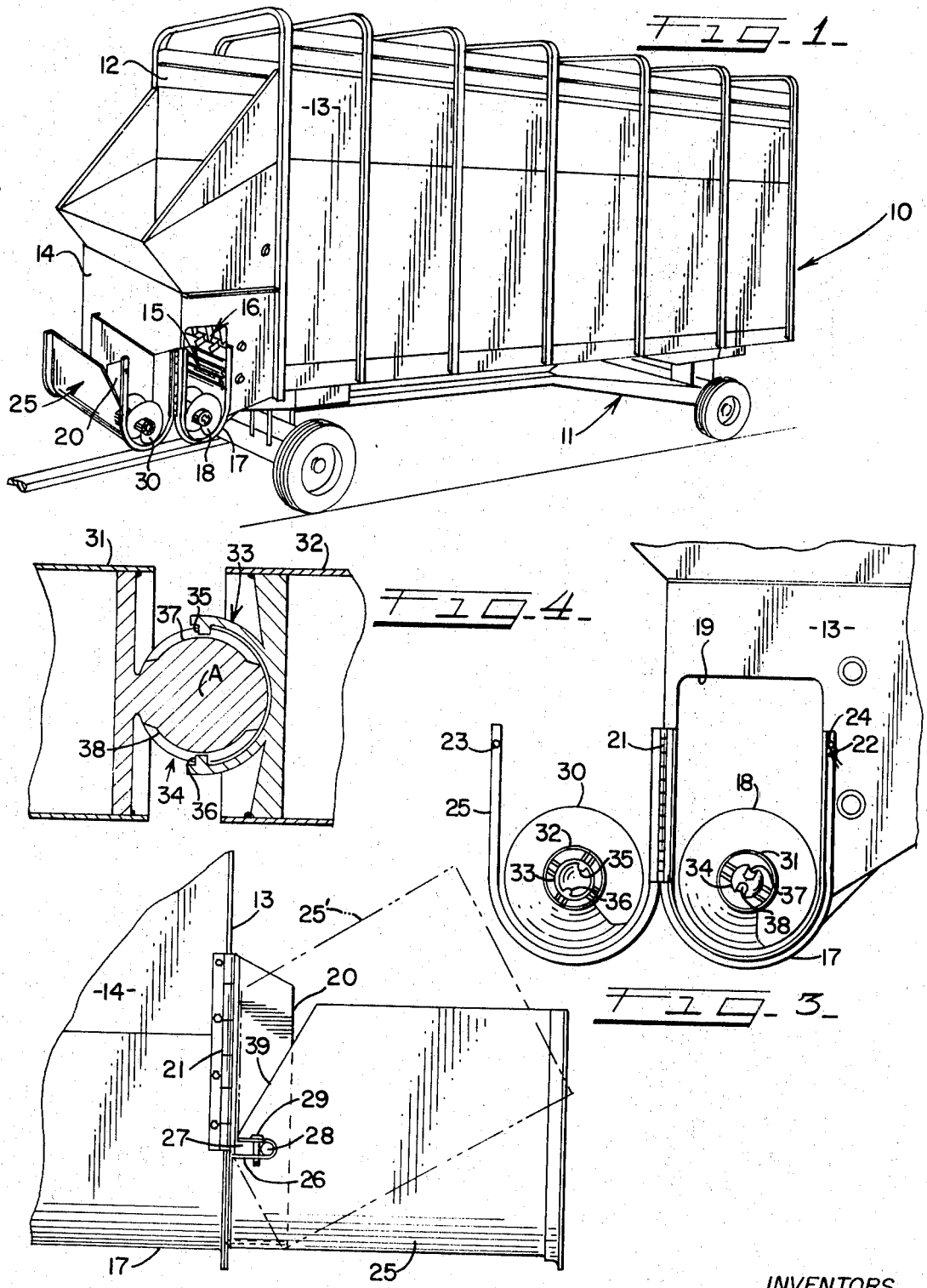
FIG. 1 is a perspective view of a self-unloading wagon having a conveyor extension disposed in a transport position.
FIG. 2 is a fragmentary elevation view of the conveyor extension disposed in operative positions.
FIG. 3 is a fragmentary side elevation view of the forage wagon showing the conveyor extension in a transport position.
FIG. 4 is a fragmentary sectional view of the connection between the auger sections.

REferring first to FIG. 1 there is shown a self-unloading wagon of the agricultural type commonly referred to as a forage wagon. The wagon includes a box 10 which is supported on conventional running gear 11. The wagon is adapted to be pulled and powered by a farm tractor. The box 10 includes the usual side walls 12 and 13 and a front end wall 14. A bed chain conveyor of conventional type is shown at 15 and is adapted to move a load of material forwardly within the box 10. Self-unloading wagons of this type normally include a plurality of beaters disposed transversely across the forward end of the wagon for shredding and loosening the material during the unloading operation. One such beater is shown at 16 disposed above the forward end of the bed chain conveyor 15.

A U-shaped trough 17 is disposed transversely across the front of the box 10 adjacent the front end wall 14. An auger 18 is disposed within the trough 17 beneath the forward edge of the bed chain conveyor 15 for delivering material from the wagon through an opening 19 defined through the sidewall 13. The bed chain conveyor 15, the beaters 16, and the cross conveyor auger 18 are adapted to be power driven by conventional means, not shown.

In accordance with the invention a conveyor extension unit is mounted on the forage wagon in receiving relation to the cross conveyor for discharging material to points remote from the wagon. The conveyor extension unit includes a U-shaped frame member 20 which is pivotally mounted on the box by a hinge 21. The hinge 21 is mounted at the corner of the box formed at the juncture of the sidewall 13 and the front wall 14. The frame member 20 is complementary in size and shape to the discharge opening 19 defined by the end of the cross conveyor trough 17. The frame member 20 is adapted to be releasably latched in a position coextensive with the trough 17 by any suitable means. In the embodiment shown a stud 22 extends outwardly from the sidewall 13 adjacent to the edge of the discharge opening 19. An opening 23 is defined through an edge of frame member 20 so that the stud 22 extends through the opening 23 when the frame is pivoted to its position coextensive with the cross conveyor. A keeper pin 24 is received on the stud 22 for retaining the frame 20 in position.

The conveyor extension unit includes a trough 25 of generally U-shape mounted on the frame member 20. The inner or intake end of the trough 25 is mounted on the frame member 20 for pivoting movement about a horizontal axis so that the outer or discharge end of the trough may be raised and lowered. The trough 25 is pivotally coupled to the frame member 20 on opposite sides thereof by a pair of hinge assemblies one of which being shown in detail in FIG. 2. The inner end of the trough 25 is provided with a U-shaped flange 26 which defines a slot 27. The flange 26 is received on a projection 28 extending from the frame member 20. A pin 29 is received through the flange 26 to retain the trough on the projection 28 of the frame member. It will be understood that the hinge assembly on the opposite side of the frame member 20 and trough 25 is a duplicate of that described above.

The conveyor extension unit includes an auger 30 received in the trough 25 and being approximately coextensive in length therewith. The auger 30 is adapted to be drivingly coupled to the cross conveyor auger 18 by a universal joint connection which accommodates pivoting movement of the conveyor extension unit about the horizontal axis defined by the projections 28. The augers 18 and 30 include tubular core sections 31 and 32, respectively. As shown in FIGS. 3 and 4 a socket member 33 is secured to the core 32 and a ball member 34 is secured to the core 31. The socket member 33 includes a pair of diametrically opposed lugs 35 and 36. The ball member 34 includes a pair of diametrically spaced longitudinally extending grooves 37 and 38 which are disposed to receive the lugs 35 and 36, respectively, when the ball is received within the socket. As best shown in FIG. 4 the convex exterior of the ball member 34 and the concave interior of the socket member 33 are defined about points which coincide at A when the members are disposed in coupled relation. The grooves 37 and 38 are defined about point A to provide arcuate paths accommodating the lugs 35 and 36. Accordingly it will be seen that a driving connection is maintained throughout relative angular movement of the augers about point A.

The simplified connection provided by the pair of lugs and grooves permits the augers to be separated by simply shifting the auger 30 axially away from the auger 18. During operation in conveying material from the wagon the reactive force of the material on the auger 30 acts to maintain the ball and socket members in coupled relation. Separate retaining devices are therefore not required. It will thus be seen that the ball and socket members provide a universal joint connecting the augers 18 and 30 when the conveyor extension unit is disposed in operative position for unloading material from the wagon.

As shown in FIG. 2, the inner end of the trough 25 above the hinge connections is inclined upwardly and away from the sidewall of the box as shown at 39 to accommodate pivoting movement of the conveyor extension. A chain or other suitable means (not shown) may be connected between the trough 25 and the sidewall of the box 10 for holding the trough in a raised position such as shown at 25'.

It will be apparent from the foregoing that upon completion of the unloading of the box the conveyor extension unit is quickly and easily swingable to a transport position shown in FIGS. 1 and 3. Upon removing the keeper pin 24 the conveyor extension unit is pivoted on the hinge 21. The socket member 33 is pulled out of engagement with the ball member 34 as the auger 30 is moved with the trough 25. Due to the placement of the hinge 21 at the corner of the box the conveyor extension unit is swingable to a position in front of the end wall 14. In this position the unit does not project outwardly from the side of the wagon thereby facilitating transport of the wagon through areas restricted in size.

I claim:

1. In a self-unloading wagon having a box including a transverse end wall, a bed conveyor for moving a load of material longitudinally of the box toward said end wall, a cross conveyor extending transversely within the box along said end wall in receiving relation to the bed conveyor and being operative for discharging material through an opening in the side of the box, wherein the improvement comprises:
   an extension auger conveyor having intake and discharge ends, said conveyor being operative for conveying material from the cross conveyor;
   means mounting said extension conveyor on the side of the box in receiving relation with said cross conveyor;
   means for selectively pivoting said extension conveyor about an axis disposed proximate to said intake end to position said discharge end in raised and lowered positions while maintaining said intake end in receiving relation to said cross conveyor;
   universal joint means drivingly connecting said cross conveyor and said extension auger conveyor throughout said raised and lowered positions; and
   said mounting means including means for swinging said extension conveyor about an axis transverse to said first mentioned axis and out of receiving relation with the cross conveyor to a transport position disposed substantially abreast of said end wall.

2. The subject matter of claim 1, wherein said universal joint means includes a pair of interfitting sections mounted on the cross conveyor auger and on the extension auger conveyor respectively, said sections being separable to permit swinging of the extension auger conveyor out of receiving relation with the cross conveyor.

3. In a self-unloading wagon having a box including an end wall, a cross conveyor including a U-shaped trough disposed within the box along said end wall and an auger disposed in the trough for discharging material through an opening in the side of the box, wherein the improvement comprises:
   A a U-shaped frame member mounted on the side of the box in registration with an end of the cross conveyor trough;
   a U-shaped extension trough having an intake end mounted on said frame member in receiving relation with the cross conveyor and terminating in a discharge end;
   means mounting said extension trough for pivoting movement about a generally horizontal axis proximate to said intake end whereby said discharge end may be raised and lowered;
   an extension auger disposed in said extension trough for conveying material therealong;
   universal joints means drivingly connecting the cross conveyor auger with said extension auger thereby accommodating pivoting movement about said horizontal axis while maintaining the driving connection; and
   means mounting said frame member for selectively pivoting said extension trough about an axis transverse to said first mentioned axis to horizontally swing the same to a transport position out of receiving relation with the cross conveyor.

4. The subject matter of claim 3, wherein said universal joint means includes a pair of interfitting sections mounted on the cross conveyor auger and on the extension auger respectively, said sections being separable to permit swinging of said extension trough out of receiving relation with the cross conveyor.

5. In a self-unloading wagon having a box including an end wall, a cross conveyor including a U-shaped trough disposed within the box along said end wall and an auger disposed in the trough for discharging material through an opening in the side of the box, wherein the improvement comprises:
   a U-shaped frame member mounted on the side of the box in registration with an end of the cross conveyor trough;
   a U-shaped extension trough having an intake end mounted on said frame member in receiving relation with the cross conveyor and terminating in a discharge end;
   means mounting said extension trough for pivoting movement about a horizontal axis proximate to said intake end whereby said discharge end may be raised and lowered;
   an extension auger disposed in said extension trough for conveying material therealong;
   universal joint means drivingly connecting the cross conveyor auger with said extension auger thereby accommodating pivoting movement about said horizontal axis while maintaining the driving connection; and
   means mounting said frame member for pivoting movement relative to the side of the box and including hinge means mounted proximate to the juncture of the end wall and sidewall of the box, said hinge means defining a vertical pivot axis about which said frame member is swingable out of receiving relation with the cross conveyor to dispose the same into a transport position substantially parallel to and adjacent to the end wall.

6. In a self-unloading wagon having a box including an end wall, a cross conveyor including a U-shaped trough disposed within the box along said end wall and an auger disposed in the trough for discharging material through an opening in the side of the box, wherein the improvement comprises:
   a U-shaped frame member mounted on the side of the box in registration with an end of the cross conveyor trough;
   a U-shaped extension trough having an intake end mounted on said frame member in receiving relation with the cross conveyor and terminating in a discharge end;
   means mounting said extension trough for pivoting movement about a horizontal axis proximate to said intake end whereby said discharge end may be raised and lowered;
   an extension auger disposed in said extension trough for conveying material therealong;
   universal joint means comprising a pair of interfitting sections mounted on the cross conveyor auger and on the extension auger respectively, said sections being operative for drivingly connecting the cross conveyor auger with said extension auger thereby accommodating pivoting movement about said horizontal axis while maintaining the driving connection and separable to permit swinging of said extension trough into said transport position; and
   means mounting said frame member for pivoting movement relative to the side of the box and including hinge means mounted proximate to the juncture of the end wall and sidewall of the box, said hinge means defining a vertical pivot axis about which said frame member is swingable out of receiving relation with the cross conveyor to dispose the same into a transport position substantially parallel to and adjacent to the end wall.